No. 825,233. PATENTED JULY 3, 1906.
B. MOORE.
NUT LOCK.
APPLICATION FILED DEC. 20, 1905.
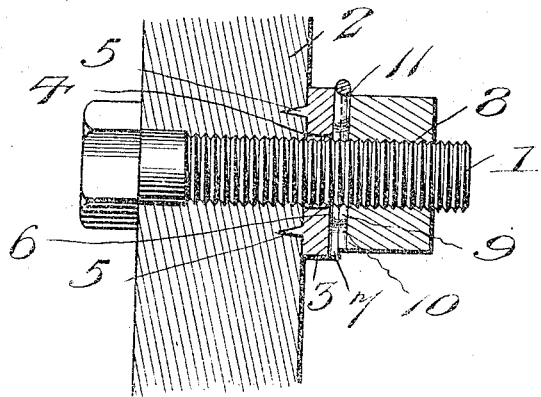
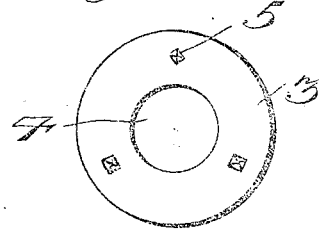
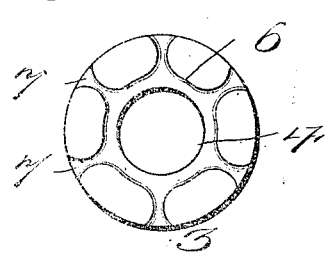
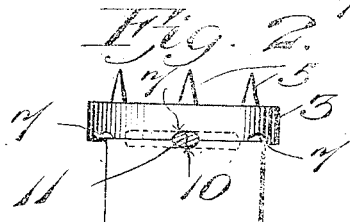
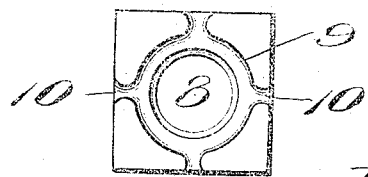
Witnesses
Inventor
Benton Moore
By Victor J. Evans
Attorney

UNITED STATES PATENT OFFICE.

BENTON MOORE, OF CHERRYVALE, KANSAS.

NUT-LOCK.

No. 825,233. Specification of Letters Patent. Patented July 3, 1906.

Application filed December 20, 1905. Serial No. 292,608.

*To all whom it may concern:*

Be it known that I, BENTON MOORE, a citizen of the United States of America, residing at Cherryvale, in the county of Montgomery and State of Kansas, have invented new and useful Improvements in Nut-Locks, of which the following is a specification.

The invention relates to an improvement in nut-locks designed to prevent the accidental disengagement of the nut from the coöperative bolt.

The main object of the invention is the provision of a nut-lock comprehending a washer to be inserted between the nut and retaining-surface, the washer-face and contiguous nut-face to be formed with registering recesses to receive a split key to lock the washer and nut together.

The invention in detail will be described in the following specification with particular reference to the accompanying drawings, in which—

Figure 1 is a sectional view illustrating the application of my improved nut-lock, the bolt being shown in elevation. Fig. 2 is a view in elevation with the key in section, illustrating the locking operation of the key. Fig. 3 is a face plan of the nut. Fig. 4 is a bottom plan of the washer. Fig. 5 is a face plan of the washer. Fig. 6 is an elevation of the key.

Referring to the drawings, wherein like reference-numerals indicate like parts throughout the several views, 1 represents a bolt of any desired construction, arranged to be passed through any suitable fixture 2.

3 represents a washer, preferably circular in plan and formed with a central opening 4 to loosely engage the bolt 1. On its rear surface, or that surface next the fixture 2, the washer is formed or provided with a plurality of spurs 5, arranged to be driven into the material of the fixture to prevent independent revolution of the washer on the bolt. On its face the washer is formed with a horizontally-arranged recess 6, concentric with the bolt-opening 4, the inner edge of this recess terminating at the edge of the bolt-opening. Recesses or grooves 7 radiate from the recess 6, being in communication with the latter at their inner ends and terminating at the periphery of the washer, as clearly shown in Fig. 5. This construction provides a recess concentric with the bolt-opening and in communication with the periphery of the washer by a series of radially-projecting and regulary-spaced grooves.

The nut is of usual form, being formed with the ordinary threaded bolt-receiving opening 8. A recess 9, similar in dimensions to the recess 6 in the washer, is arranged concentric with the bolt-opening 8. A series of radially-projecting grooves 10 communicate with the recess 9 and extend therefrom to the edges of the nut, as clearly shown in Fig. 3.

The recesses and grooves in both the washer and nut are preferably about semi-cylindrical in section, so that when these recesses and grooves in the respective parts are arranged to register a practically circular opening is formed between the meeting edges of the washer and nut. It is to be also noted that the terminals of the grooves 7 and 10 in the washer and nut, respectively, have flared or divergent walls, so that the entrance to the opening formed by the registering grooves of the nut and washer when assembled is shaped to exert a clamping or binding action on the key, and thereby materially aid in preventing accidental displacement of the key.

In practice the washer is passed over the bolt, with its spurs seating in the fixture, after which the nut is screwed down tightly onto the washer, being arranged so that one of its grooves 10 registers with one of the grooves 7 of the washer. A split key 11 is now inserted in the opening formed by the registering grooves, being driven therein until the terminals of the key contact with the bolt. This contact separates the terminals, and on a further movement of the key said terminals will spread and ride in the registering recesses 6 and 9 of the washer and nut. The key is practically circular in section, with its terminals formed longitudinally and vertically thereof, so that half of each terminal is held in the respective groove and recess of the washer, and the other half of the key-terminal is held in the registering groove and recess of the nut. The nut is thus held against independent movement on the bolt, being locked to the washer through the medium of the key as described.

In the event the fixture 2 is of wood the washer is preferably formed with a plurality of spurs 5, which may be driven directly into the wood; but in the event such fixture should be of metal the washer will be provided with a single spur and a suitable opening tapped into the fixture to receive the spur, as the sole function of the spur is to prevent independent turning of the washer.

The construction described is simple and efficient in use, but a single key being required to securely lock the parts together.

By preference the washer is slightly greater in diameter than the nut, so that the key may be driven completely home and yet project slightly beyond the plane of the nut, whereby to prevent convenient operation of a suitable tool for withdrawing the key.

The nut, though shown square in plan, may be any shape desired, and the grooves 7 in the washer and the grooves 10 in the nut may be in any number necessary.

Having thus described the invention, what is claimed as new is—

1. A nut-lock comprising a washer arranged to slidably engage the bolt and formed on its face with a recess concentric with the bolt-opening and with a plurality of grooves opening through the edge of the washer and in communication with the recess, a nut provided with a recess concentric with the bolt-opening and with radiating grooves opening through the edge of the nut and communicating with said recess, the recesses of the washer and nut and one of the grooves in each is arranged to respectively register, the entrance-opening of said grooves being flared to provide when said grooves are in register a converging entrance, and a split key to be driven into said registering grooves and spread its terminals in the registering recesses, the members of the key being forced together by the converging entrance, whereby to clamp the key against accidental withdrawal.

2. A nut-lock comprising a washer formed with a recess and with a radiating groove communicating therewith, a nut formed with a similar groove and recess, the grooves and recesses being arranged to respectively register, the side walls of the outer ends of each groove diverging toward said end, and a split key arranged to be seated in the registering grooves with its terminals spread into the registering recesses, said key being held in position by the clamping engagement of the members thereof with the diverging walls of the grooves.

In testimony whereof I affix my signature in presence of two witnesses.

BENTON MOORE.

Witnesses:
J. W. HOLDREN,
L. P. BROOKS.